Feb. 21, 1956  L. H. HOLDEMAN  2,735,376
APPARATUS FOR SUPPORTING RAILWAY VEHICLES
Filed April 13, 1951  4 Sheets-Sheet 2
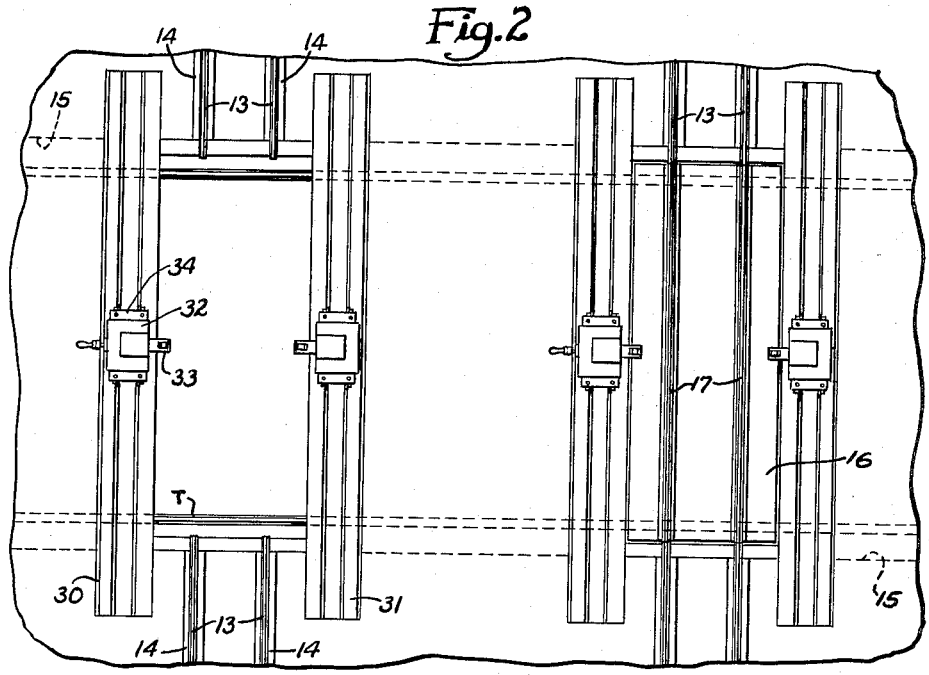
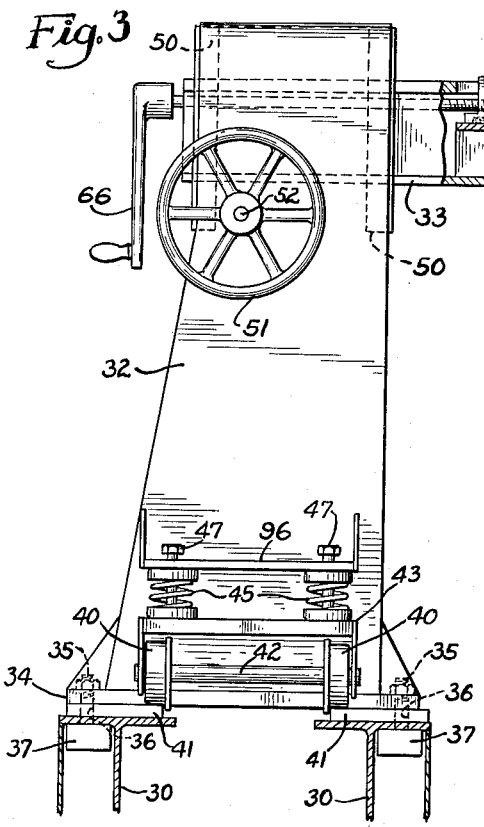
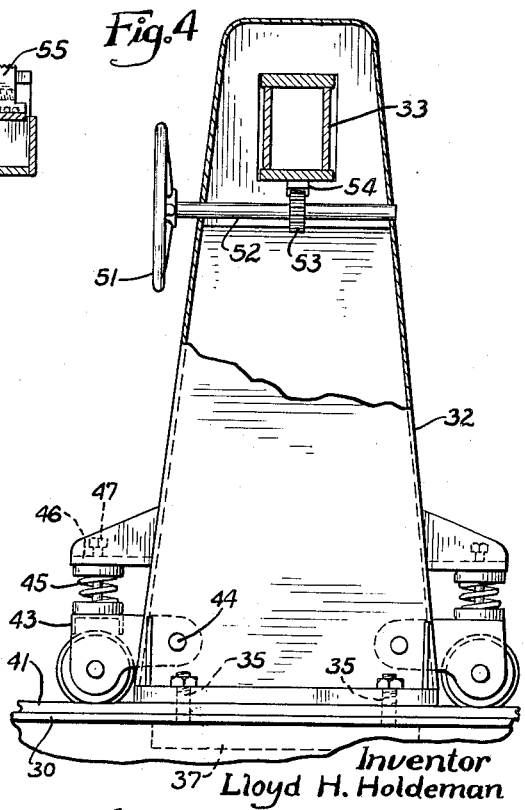
Inventor
Lloyd H. Holdeman Feb. 21, 1956 — L. H. HOLDEMAN — 2,735,376
APPARATUS FOR SUPPORTING RAILWAY VEHICLES
Filed April 13, 1951 — 4 Sheets-Sheet 3
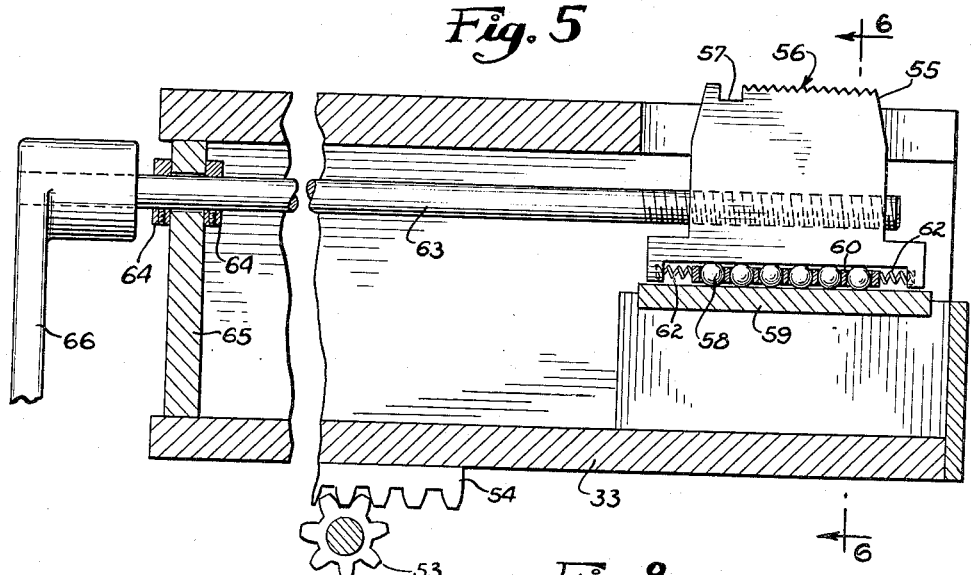
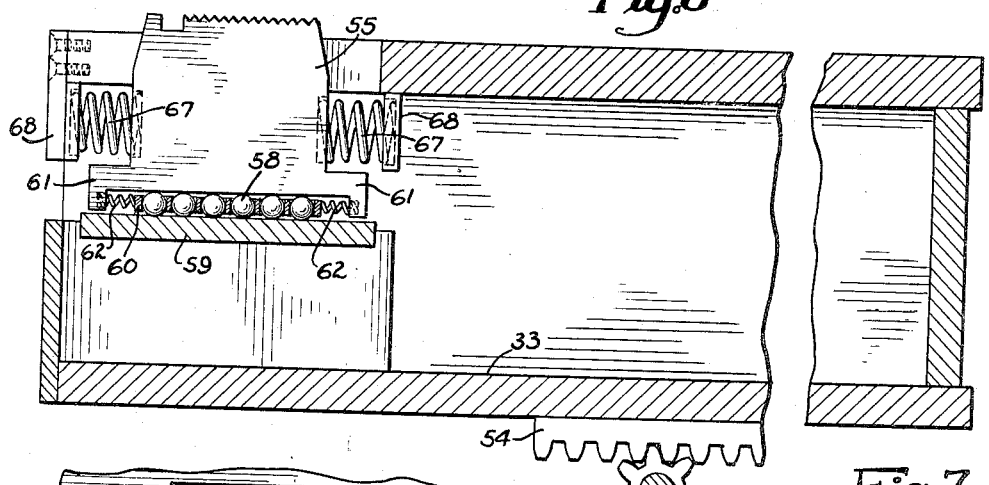
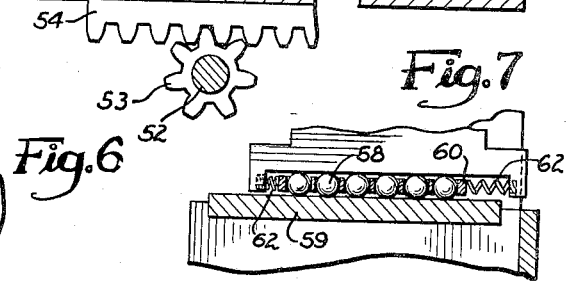
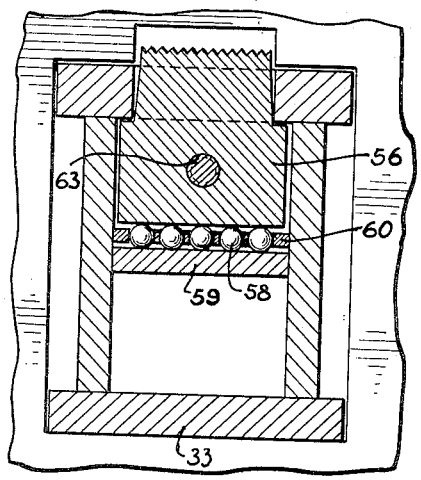
Inventor
Lloyd H. Holdeman Feb. 21, 1956 L. H. HOLDEMAN 2,735,376
APPARATUS FOR SUPPORTING RAILWAY VEHICLES
Filed April 13, 1951 4 Sheets-Sheet 4
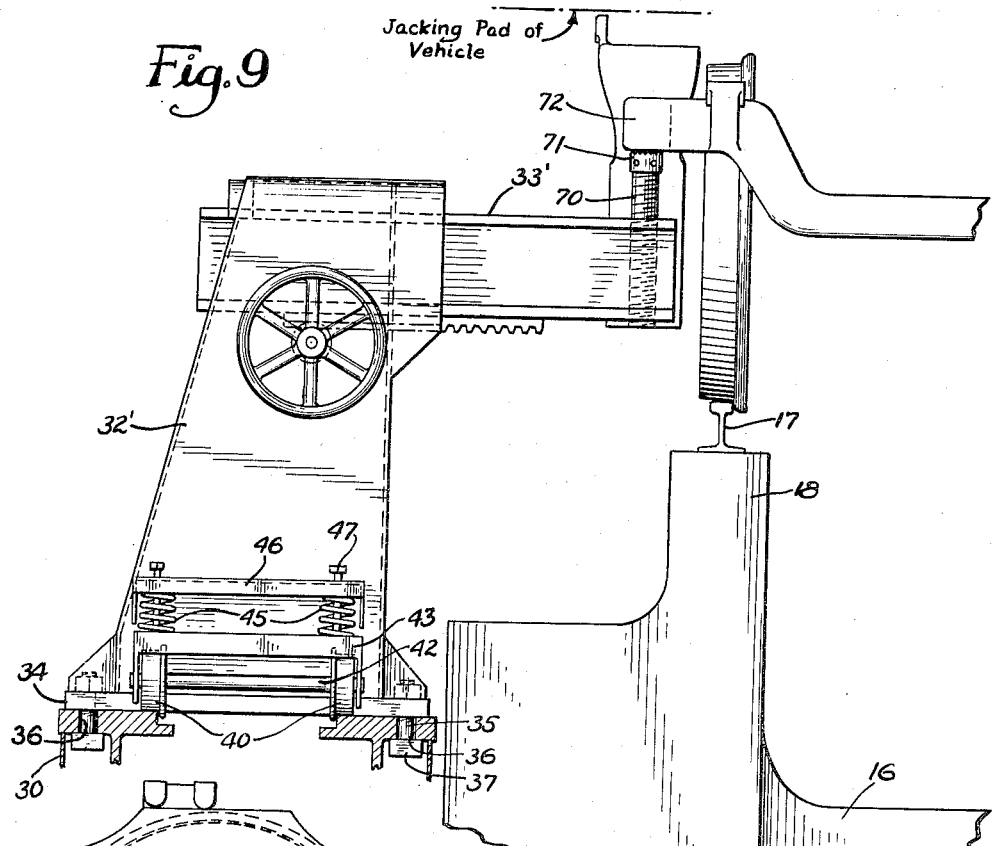
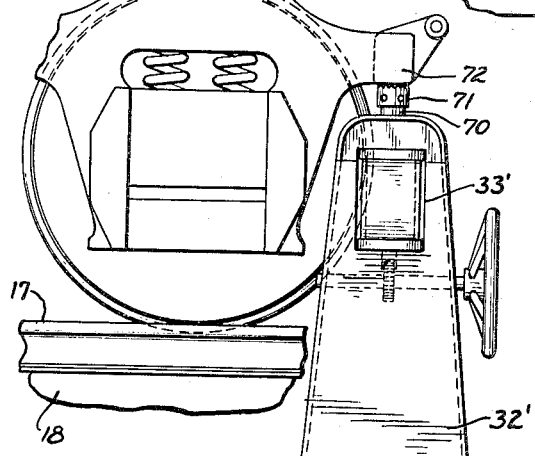
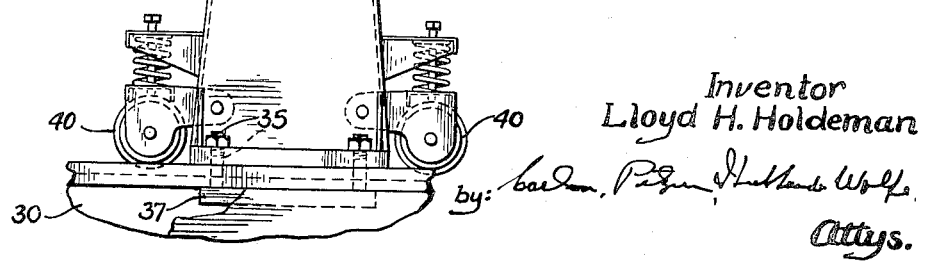
Inventor
Lloyd H. Holdeman United States Patent Office 2,735,376
Patented Feb. 21, 1956

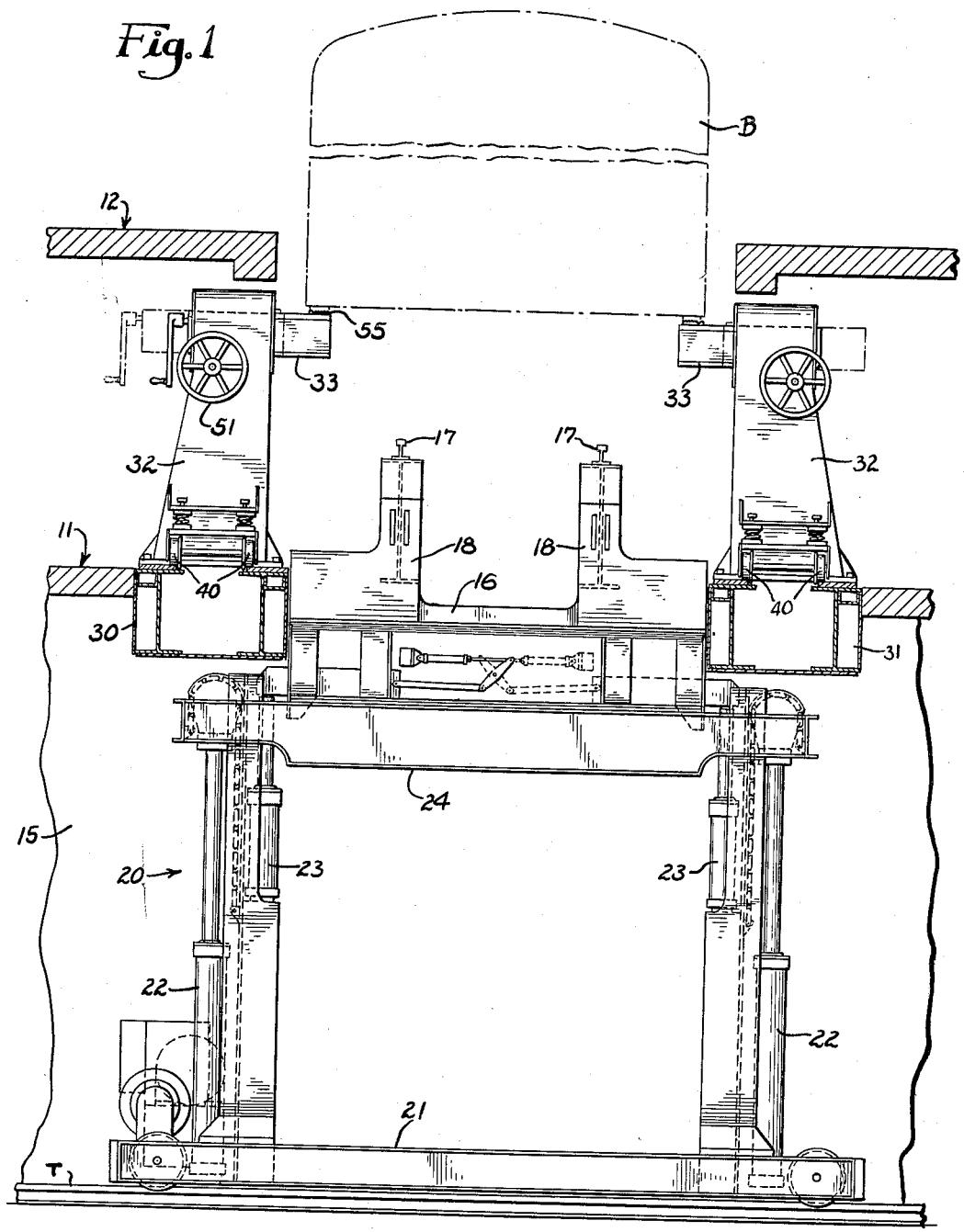

2,735,376

APPARATUS FOR SUPPORTING RAILWAY VEHICLES

Lloyd H. Holdeman, Muskegon, Mich., assignor to Manning, Maxwell & Moore, Inc., Muskegon, Mich., a corporation of New Jersey Application April 13, 1951, Serial No. 220,842

5 Claims. (Cl. 104—32)

The invention relates to apparatus for servicing railway locomotives and other vehicles, and more particularly to apparatus for supporting the bodies of such vehicles while the wheels or trucks are being removed and replaced.

Railway repair shops intended for the above type of service commonly have a drop pit intersecting one or more service tracks which are extended across the pit by drop tables releasably latched in bridging position across the pit. Vehicles are positioned with the trucks or wheels to be serviced spotted on the table and such trucks or wheels may be released and lowered into the pit by means of elevator mechanism provided therein. The replacement trucks or wheels are raised into place by this elevator mechanism for re-attachment to the vehicle.

The invention is concerned primarily with the problem of supporting the body of the vehicle upon removal of a truck or a pair of wheels and its general object is to provide improved apparatus for that purpose which leaves the sides of the vehicle substantially unobstructed and conveniently accessible for other work to be performed thereon.

Another object is to provide vehicle supporting apparatus which permits removal of either a complete truck or of one or more sets of wheels, the attachment of the truck to the vehicle being undisturbed in the latter case.

A further object is to provide supporting apparatus which permits of substantial lateral adjustment of the position of the supported vehicle for lining up the cooperating parts when replacing a truck or a set of wheels.

It is also an object of the invention to provide vehicle supporting apparatus which is characterized by its adaptability, efficiency and safety in operation.

Other objects and advantages of the invention will become apparent from the following detailed description of the preferred embodiments illustrated in the accompanying drawings, in which:

Figure 1 is a fragmentary vertical sectional view of a drop pit installation equipped with vehicle supporting apparatus embodying the features of the invention.

Fig. 2 is a fragmentary plan view of the drop pit and associated vehicle supporting apparatus.

Fig. 3 is a side elevational view of one of the pedestals forming a part of the supporting apparatus.

Fig. 4 is a partly sectioned front view of the pedestal shown in Fig. 3.

Fig. 5 is a longitudinal sectional view of the supporting bar and adjustable pad provided on one of the pedestals.

Fig. 6 is a sectional view taken in a vertical plane substantially on the line 6—6 of Fig. 5.

Fig. 7 is a fragmentary sectional view taken in the same plane as Fig. 5 showing the pad adjusted to one limit position.

Fig. 8 is a longitudinal sectional view of the supporting bar and adjustable pad provided on the companion pedestal.

Fig. 9 is a partly sectioned side view of a modified form of pedestal and associated supporting elements particularly adapted for supporting a vehicle truck.

Fig. 10 is a rear elevational view of the pedestal and associated elements shown in Fig. 9.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The present invention may be used with various pit and trackage arrangements for servicing a wide variety of railway vehicles. The installation shown by way of illustration is particularly adapted for servicing diesel locomotives and comparable vehicles. To this end it includes in addition to the usual working floor 11 (Fig. 1) an elevated platform 12 permitting the upper part or body of the vehicle to be worked on while the running gear is being serviced by workmen on the main floor 11. It will be understood that the platform 12 is located high enough above the floor 11 to provide ample head room for the workmen on the main floor.

To locate the vehicle body for convenient access from the platform 12, the service tracks on which the vehicles are moved into and out of servicing position are desirably raised above the level of the floor 11. In the particular installation illustrated the rails 13 forming the service tracks are carried on longitudinal beams 14 extending substantially above the floor level. The space between the beams may serve as an inspection pit.

For truck and wheel servicing the service tracks 13 are intersected by a drop pit 15. Drop tables 16 releasably latched to the pit walls in well known manner bridge the pit at the various service tracks and carry track sections 17 which extend the service tracks across the pit for the accommodation of the vehicle. The tables 16 may be equipped with suitable spacing blocks or may be constructed as shown in Fig. 1 with spaced beams 18 extending substantially above the table tops for locating the track section 17 at the level of the service tracks when the table is latched in place.

Elevator mechanism of any suitable type is provided in the pit 15 for raising, lowering and transporting the drop tables 16 and the loads carried on such tables. The elevator mechanism 20, shown by way of example, is of the general type disclosed in the Holdeman and Hybarger, Patent No. 2,655,114, issued October 13, 1953. In general, the elevator mechanism comprises a wheeled carriage 21 adapted to run on a track T extending longitudinally of the pit 15. The carriage is equipped in this instance with dual power operated mechanisms 22 and 23 for raising and lowering an elevator table assembly 24 adapted to cooperate with the drop tables 16. The mode of operation of such elevators is well known and need not be described in detail here.

When a truck is to be removed from a vehicle the latter is run over the service track with such truck spotted on the table 16. The elevator mechanism is then operated to raise the table slightly above its normal position to permit retraction of the latches supporting the table on the pit walls and also the disengagement of the fastening devices normally securing the truck to the vehicle. Then after suitable support is provided for the body of the vehicle, the drop table along with the detached truck is lowered into the pit and transported to another service or repair track.

In accordance with the invention the body B of the vehicle from which a truck or set of wheels has been removed as above described is supported by novel apparatus which leaves the sides of the vehicle, including the undercarriage, conveniently assembled for work to be performed thereon. More particularly the supporting apparatus is constructed and arranged to perform its supporting function without interposing any unnecessary obstructions between the vehicle and the working space on the main floor 11. To this end, there is provided a pair of sturdy beams 30 and 31 arranged parallel to the service track on opposite sides of the table 16 and extending in bridging relation across the pit 15. The beams are installed with their upper faces substantially flush with the floor 11. For effecting supporting engagement with the car body, each of the beams 30 and 31 has associated with it a narrow, upright pedestal 32 equipped with a retractible supporting element or bar 33. Accordingly, only the pedestal is interposed between the vehicle and the working area of the floor 11.

The supporting bar 33 of each pedestal is mounted thereon for movement transversely with respect to the service track from a retracted position clear of the vehicle, as shown in broken lines in Fig. 1, to an operated or projected position underlying the body B of the vehicle, as shown in full lines in that figure. Accordingly, when the truck is lowered into the pit, the weight of the vehicle body is transferred to the supporting bars, and from there through the pedestals to the beams 30 and 31.

The pedestals 32 are ruggedly constructed to bear the weight of a heavy vehicle such as a Diesel locomotive. In the preferred form shown, each pedestal comprises a sturdy metal shell tapering slightly from top to bottom and terminating at its lower end in an outwardly directed flange 34. This flange is adapted to rest on the upper face of the associated beam 30 or 31 when the pedestal is supporting the vehicle body. For maximum safety the pedestal is preferably rigidly secured in place as by means of bolts 35 extending through the flange 34 and through longitudinal slots 36 in the adjacent face of the beam, the bolts as shown terminating at their lower ends in elongated heads 37.

To enable the supporting pedestals to be positioned for cooperation with different types of vehicles, provision is made whereby they may be adjusted longitudinally of the beams 30, 31. To this end each of the pedestals is provided with flanged wheels 40 adapted to run on tracks 41 formed, in this instance, by having reinforcing bars welded or otherwise affixed to the upper face of each of the beams. As shown in Figs. 3 and 4, two pairs of the wheels 40 are provided on each pedestal. The wheels of each pair are carried on an axle 42 journaled in an L-shaped bracket 43 pivotally mounted on the walls of the pedestal as at 44 to swing about an axis disposed transversely of the track 41.

Compression springs 45 interposed between each of the wheel supporting brackets 43 and a stationary abutment 46 projecting laterally from the pedestal above the bracket urges the wheels downwardly into engagement with the track. Preferably the springs are capable of supporting the weight of the pedestal and the elements carried thereby when not under load. Accordingly, when the bolts 35 are loosened, the flange 34 of the pedestal is lifted from contact with the beam and the entire pedestal may be shifted along the beam on the wheels 40. In this movement, the bolts 35 slide along the slots 36 provided for their accommodation. When the pedestal is located in the desired positions the bolts 35 are again tightened to compress the springs 45 and clamp the flange 34 rigidly against the beam. Headed members 47 extending through apertures in the abutments 46 and threaded into the wheel supporting brackets 43 limit the downward movement of the latter brackets.

The supporting bars 33 are preferably rectangular in cross section and are fabricated in the present instance from heavy steel plates. Reinforcing members 50 welded or otherwise rigidly fixed in the upper portions of the pedestal support and guide the bars for endwise sliding movement in a direction transversely of the service track with which the supporting apparatus is associated. This mounting permits withdrawal of the supporting bars to the retracted position in which they are shown in broken lines in Fig. 1, so that a vehicle may be run onto the drop table 16 without interference from the bars. After the vehicle has been properly spotted, the supporting bars are shifted to their projected or operated position in which their inner ends underlie the vehicle body for supporting the same when the wheels or trucks are lowered into the pit 15.

In the exemplary embodiment the supporting bars 33 are shifted between retracted and projected positions by manually operable means including a hand wheel 51 fixed on the outer end of a horizontally disposed shaft 52 extending through and journaled on the pedestal 32. Within the pedestal the shaft 52 carries a pinion 53 meshing with a rack 54 fixed to the underside of the supporting bar. Accordingly, the bar may be shifted in either direction by appropriate rotation of the hand wheel.

As indicated heretofore, trucks or wheels to be replaced on a vehicle are run onto the track section 17 on the table 16 and raised into place by the elevator mechanism 20. It will be appreciated that the lateral location of the connecting elements of the trucks or wheels may vary substantially, due to the play or clearance necessary between the flanges of the wheels and the rails on which they are supported. In accordance with another aspect of the invention, provision is made whereby the supported car body may be adjustably positioned transversely of its longitudinal axis, that is, crosswise of the service track to accurately line up the cooperating parts on the vehicle with those on the truck being refitted to the vehicle in the above manner.

Such lateral adjustment is provided in accordance with the invention by equipping each of the supporting bars 33 with an adjustable vehicle engaging pad 55. Preferably the pad 55 is in the form of a generally rectangular metal block and its upper surface 56 is corrugated or otherwise roughened to afford a non-slip surface for engagement with the vehicle body. The pad may also be formed with a transverse slot 57 for engagement with a similarly shaped locating and locking rib on the vehicle.

The pads 55 are supported on the bars 33 in a novel manner which permits shifting with a minimum of effort when under load as when supporting a vehicle body. For this purpose each of the pads is supported by a plurality of anti-friction bearing elements herein shown as balls 58 interposed between the lower face of the pad and the upper face of a cross member 59 rigidly fixed within the bar 33. An apertured retainer plate 60 maintains the elements 58 properly spaced apart. To accommodate the movements of the ball and retainer assembly relative to the pad and cross member, the pad is preferably provided with projections 61 at each end affording extensions of the bearing surface on the lower face of the pad. A spring 62 interposed between downwardly directed flanges on the edges of the projections 61 and the adjacent ends of the retainer 60 constrain the latter following the movements of the pad and insure centering of the retainer when the pad is in centered position.

To facilitate lateral adjustment of the supported vehicle and at the same time guard against accidental or inadvertent shifting of the same, one of the pads is provided with a screw type shifting device. This device as shown comprises a rod 63 having one end threaded into the pad and the other end projecting at the outer end of the associated bar 33. As shown in Fig. 5, the rod 63 is restrained against endwise movement relative to the bar 33 by collar 64 fixed to the rod on opposite sides of the end wall 65 of the supporting bar. A hand crank 66 fixed on the projecting outer end of the rod provides convenient means for rotating the rod.

To permit the pad 55 on the companion supporting bar to move concurrently with the shifting of the pad associated with the mechanism above described, that pad is yieldably held in a centered position by compression springs 67 interposed between opposite ends of the pad and depending brackets 68 formed on or rigidly secured to the associated bar 33, as shown in Fig. 8. These springs insure return of the pad to centered position in case that the load is removed therefrom while the pad is in a shifted position. The other pad, of course, may be returned to centered position by manipulation of the crank 66.

The modified form of pedestal 32' shown in Figs. 9 and 10 is similar in all respects to the pedestal 32 hereinbefore described except that it is made substantially shorter so that it may be used to support a vehicle truck while a set of wheels is removed. As will be seen by reference to the drawings, the pedestal 32' is equipped with the same mechanism for adjusting it along the beam 30 or 31, as the case may be, and for clamping it in a fixed position of adjustment. Pedestal 32' is equipped with a supporting bar 33' similar to the bar 33 except that the adjustable pad 55 is omitted. Instead of such pad, the bar 33' is provided at its outer end with a screw jack 70 having a head 71 which may be raised or lowered for cooperation with a jacking pad 72 provided on the vehicle truck as shown in Fig. 9. The adjustability of the engaging element 71 thus makes it practical to utilize the supporting apparatus with various types of trucks.

The modified form of pedestal supporting apparatus may be readily used for supporting vehicle bodies by the provision of a suitable spacing member (not shown) between the end of the bar 33' and the jacking pad of the vehicle. Where the greater part of the work to be done is in servicing wheels rather than trucks, pedestals of the type exemplified at 32' may be used exclusively. Alternatively, both types of pedestals 32 and 32' may be provided, if desired, thus making the installation universally available for servicing the running gear of a wide variety of railway vehicles.

It will be apparent from the foregoing that the invention provides vehicle supporting means of a novel and advantageous character for supporting the body of a vehicle while a truck or set of wheels are removed. The apparatus leaves the sides of the vehicle substantially unobstructed so that the running gear or the body of the vehicle may be worked on conveniently. Furthermore, the supported vehicle may be adjusted laterally within predetermined limits to assist in alining the cooperating parts of trucks or wheels being reapplied to the vehicle. Work on the vehicle is thus facilitated, repair costs are reduced, and idle vehicle time is held to a minimum.

I claim as my invention:

1. Vehicle supporting apparatus for use in a railway shop installation including a service track having a section adapted to be lowered into a drop pit intersecting and extending beneath the service track for removing wheels or trucks from a vehicle on the service track, said apparatus serving to support the vehicle while the wheels or trucks are removed and comprising, in combination, a pair of beams extending across the pit on opposite sides of said track section, an upright pedestal mounted on each of said beams for adjustable positioning longitudinally of the beam, a supporting bar mounted on each pedestal for endwise sliding movement transversely of the service track between a retracted position clear of a vehicle standing on said track section and a projected position with one end underlying and supporting the body of the vehicle, a vehicle engaging pad supported on each of the bars for movement longitudinally of the bar, and manually operable means mounted on one of said bars and operatively connected to the associated pad for shifting such associated pad longitudinally of the bar, the pad on the other of said bars being shifted concurrently therewith by the movement of the vehicle engaged by the pads.

2. Apparatus for supporting a vehicle body while the wheels are being removed and replaced comprising, in combination, a pair of upright pedestals positioned on opposite sides of the vehicle, a bar mounted on each pedestal for movement from a retracted position clear of the vehicle to a projected position with one end underlying the body of the vehicle, a pad at said one end of each of the bars engaging and supporting the vehicle body, and bearing means carried by said bars supporting said pads for limited movement along said bar transversely of the vehicle.

3. Apparatus for supporting a vehicle body while the wheels are being removed and replaced comprising, in combination, a pair of upright pedestals positioned on opposite sides of the vehicle, a bar mounted on each pedestal for movement from a retracted position clear of the vehicle to a projected position with one end underlying the body of the vehicle, a pad mounted on each of said bars in a position to engage and support the body of the vehicle, said pads being shiftable relative to the bars transversely of the vehicle, and means mounted on one of said bars and operatively connected to the associated pad operable manually to shift such associated pad.

4. Apparatus for supporting a vehicle body while the wheels are being removed and replaced comprising, in combination, a pair of upright pedestals positioned on opposite sides of the vehicle, a bar mounted on each pedestal for movement from a retracted position clear of the vehicle to a projected position with one end underlying the body of the vehicle, a pad carried by each of said bars in a position to engage and support the body of the vehicle when the bar is projected, anti-friction bearing means supporting said pads on the respective bars for movement longitudinally thereof, manually operable means mounted on one of said bars and operatively connected with the pad on that bar for shifting said pad longitudinally of the bar, and spring means interposed between the other of said bars and the pad carried thereby tending to maintain such pad in a central position.

5. Apparatus for supporting a vehicle body while the wheels are being removed and replaced comprising, in combination, a pair of upright pedestals positioned on opposite sides of the vehicle, a bar mounted on each pedestal for movement from a retracted position clear of the vehicle to a projected position with one end underlying the body of the vehicle, a cross member at one end of each bar defining a flat horizontally disposed bearing surface, a pad element having a flat bearing surface on its lower face overlying said first mentioned bearing surface, a plurality of anti-friction bearing elements interposed between said bearing surfaces to support said pad element for movement longitudinally of the bar, a retainer cooperating with said bearing elements to maintain them in predetermnied spaced relation, and spring means interposed between said retainer and the overlying pad effectively biasing the retainer toward a centered position.

References Cited in the file of this patent

UNITED STATES PATENTS

| | | |
|---|---|---|
| 1,469,997 | Cornwall | Oct. 9, 1923 |
| 1,652,265 | Baker | Dec. 13, 1927 |
| 2,097,968 | Edmunds | Nov. 2, 1937 |
| 2,327,446 | Ortgies | Aug. 24, 1943 |
| 2,454,225 | Skinner | Nov. 16, 1948 |
| 2,566,718 | Collins | Sept. 4, 1951 |
| 2,614,504 | Holmes et al. | Oct. 21, 1952 |
| 2,640,435 | Griffiths | June 2, 1953 |
| 2,655,114 | Holdeman et al. | Oct. 13, 1953 |
| 2,685,843 | Skinner | Aug. 10, 1954 |

FOREIGN PATENTS

| | | |
|---|---|---|
| 7,799 | Great Britain | June 29, 1888 |
| 194,630 | Switzerland | Mar. 1, 1938 |

OTHER REFERENCES

Car Builders Cyclopedia of 1931, page 1148. (A copy of the "Cyclopedia," available for photostatic copies is in Div. 34 of the Patent Office.)